Reissued Sept. 26, 1950

Re. 23,270

UNITED STATES PATENT OFFICE 23,270

2,4-DIMETHYL-2,4-TRIMETHYLSILYL-PHENYL-2,4-DISILAPENTANE

Harold A. Clark, Midland, Mich., assignor to Dow Corning Corporation, Midland, Mich., a corporation of Michigan No Drawing. Original No. 2,507,514, dated May 16, 1950, Serial No. 77,989, February 23, 1949. Application for reissue June 22, 1950, Serial No. 169,767

2 Claims. (Cl. 260—448.2)

Matter enclosed in heavy brackets [ ] appears in the original patent but forms no part of this reissue specification; matter printed in italics indicates the additions made by reissue

This invention relates to an organo silicon polymer.

It is an object of this invention to prepare a thermally stable compound which is of particular utility as a lubricant and a vacuum diffusion pump fluid. Other objects and advantages will be apparent from the following description.

This invention relates to the compound

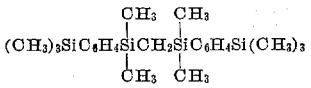

The compound of this invention may be prepared by a condensation reaction between chlorophenyltrimethylsilane and $$Cl(CH_3)_2SiCH_2Si(CH_3)_2Cl$$

in the presence of sodium. The latter compound may be obtained by reacting a methyl Grignard reagent with the compound $Cl_3SiCH_2SiCl_3$ and purification by distillation. The condensation reaction proceeds according to the equation

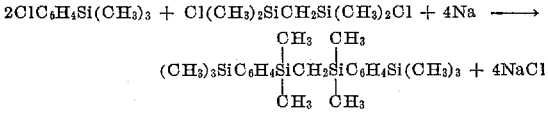

The compound of this invention is a clear oil having a viscosity of 28.3 cs. at 25° C., a boiling point of 171° C. at 1 mm., a freezing point of −54° C., a refractive index of 1.5113 at 25° C. and a density of 0.923 at 25° C. This material is stable when heated at a temperature of 365° C. in the absence of oxygen and is stable at temperatures up to 200° C. in the presence of oxygen. The compound performs satisfactorily when used to lubricate the bearing surfaces of moving metallic parts. It is also a good vacuum diffusion pump fluid as is shown by the following tests.

A sample of the compound was placed in a single stage diffusion pump and operated at 135° C. with a fore pressure of 30 microns. A vacuum of $8.1\times10^{-6}$ mm. was obtained. During the operation of the pump the material showed no sign of deterioration.

In order that this invention may be better understood, recourse should be had to the following example, which should be considered as illustrative only.

EXAMPLE 184.5 g. of chlorophenyltrimethylsilane was mixed with 100.5 g. of $Cl(CH_3)_2SiCH_2Si(CH_3)_2Cl$ and the mixture was added to 50 g. of molten sodium in 800 cc. of refluxing toluene. The reaction was exothermic so that the solvent could be maintained at reflux by regulating the rate of addition of the chlorosilanes. After addition of the silanes was completed the mixture was refluxed for an additional hour. The material was then filtered and the toluene was removed at reduced pressure. The residue was a clear oil which distilled at 171° C. at 1 mm. pressure. The compound was found to have a molar refraction of 141.77.

That which is claimed is:

1.

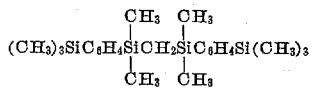

2. A method of preparing

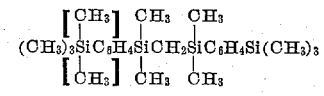

which comprises reacting chlorophenyltrimethylsilane and $Cl(CH_3)_2SiCH_2Si(CH_3)_2Cl$ by contacting a mixture thereof with metallic sodium.

HAROLD A. CLARK.

REFERENCES CITED

The following references are of record in the file of this patent or the original patent:

Goodwin: "Jour. Am. Chem. Soc.," vol. 69 (1947), page 2247.

Sommer: "Jour. Am. Chem. Soc.," vol. 69 (1947), page 930.

Bluestein: "Jour. Am. Chem. Soc.," vol. 70 (1948), pages 3068–3071.